United States Patent [19]
Nakaosa et al.

[11] Patent Number: 5,353,411
[45] Date of Patent: Oct. 4, 1994

[54] OPERATING SYSTEM GENERATION METHOD

[75] Inventors: Yoshitake Nakaosa, Sagamihara; Megumu Kondo, Kawasaki, both of Japan

[73] Assignee: Hitachi, Ltd., Tokyo, Japan

[21] Appl. No.: 951,949

[22] Filed: Sep. 28, 1992

Related U.S. Application Data

[63] Continuation of Ser. No. 412,506, Sep. 26, 1989, abandoned.

[30] Foreign Application Priority Data

Sep. 28, 1988 [JP] Japan .................. 63-240974

[51] Int. Cl.$^5$ .................. G06F 9/00; G06F 13/10
[52] U.S. Cl. .................. 395/275; 364/DIG. 1; 364/280.9; 364/238.3; 364/222.82
[58] Field of Search .................. 395/650, 700, 275

[56] References Cited

U.S. PATENT DOCUMENTS

| | | | |
|---|---|---|---|
| 4,649,479 | 3/1987 | Advani et al. | 364/300 |
| 4,730,249 | 3/1988 | O'Quin, II et al. | 364/200 |
| 4,774,659 | 9/1988 | Smith et al. | 364/200 |
| 4,819,159 | 4/1989 | Shipley et al. | 364/200 |
| 4,951,245 | 8/1990 | Bailey et al. | 364/900 |

OTHER PUBLICATIONS

"Operating Systems" written by S. E. Madnick and J. J. Donovan and published by McGraw-Hill in 1974, pp. 173-176.

Primary Examiner—Gareth D. Shaw
Assistant Examiner—John Q. Chavis
Attorney, Agent, or Firm—Fay, Sharpe, Beall, Fagan, Minnich & McKee

[57] ABSTRACT

In an operating system generation method for a computer, at a system initiation, a kernel as the basic portion of the operating system is linked with a plurality of input-output drivers controlling input-output devices. A directory name of each driver and an address thereof in a main memory are stored in a table within the kernel with a correspondence established therebetween, which allows mutual references between the kernel and the input-output drivers and which hence enables the input-output drivers to be generated in an independent fashion with respect to the kernel. As a result, the user can incorporate desired input-output drivers into an operating system depending on a hardware configuration of the computer system.

1 Claim, 11 Drawing Sheets

FIG. 2A
| DRIVER SYMBOLIC NAME 11a | INTERRUPTION NUMBER 11b | ENTRY POINT OF 11c | | POINTER OF ADDRESS T.I. 11e |
| --- | --- | --- | --- | --- |
| | | I.O. PROGRAM | INTERRUPT P. 11d | |
| DRIVER 1 | $N_1$ | $d_1$ | $i_1$ | $P_1$ |
| DRIVER 2 | $N_2$ | $d_2$ | $i_2$ | $P_2$ |
| DRIVER 3 | $N_3$ | $d_3$ | $i_3$ | $P_3$ |
| ⋮ | ⋮ | ⋮ | ⋮ | ⋮ |
| DRIVER m | $N_m$ | $d_m$ | $i_m$ | $P_m$ |
(table label 11)
FIG. 2B
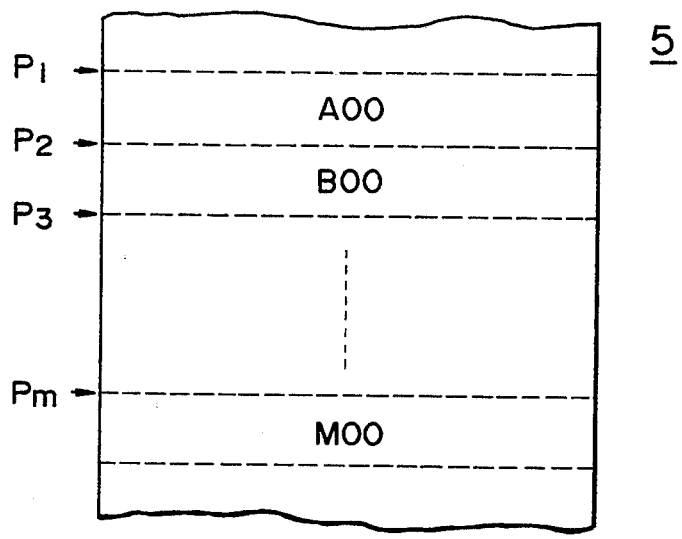
FIG. 2C
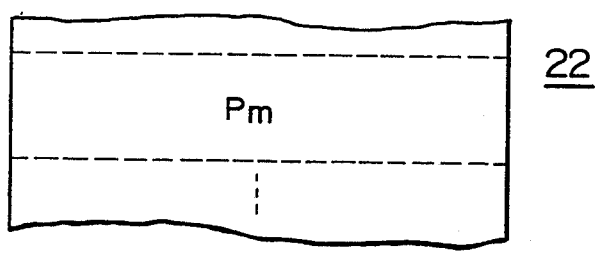

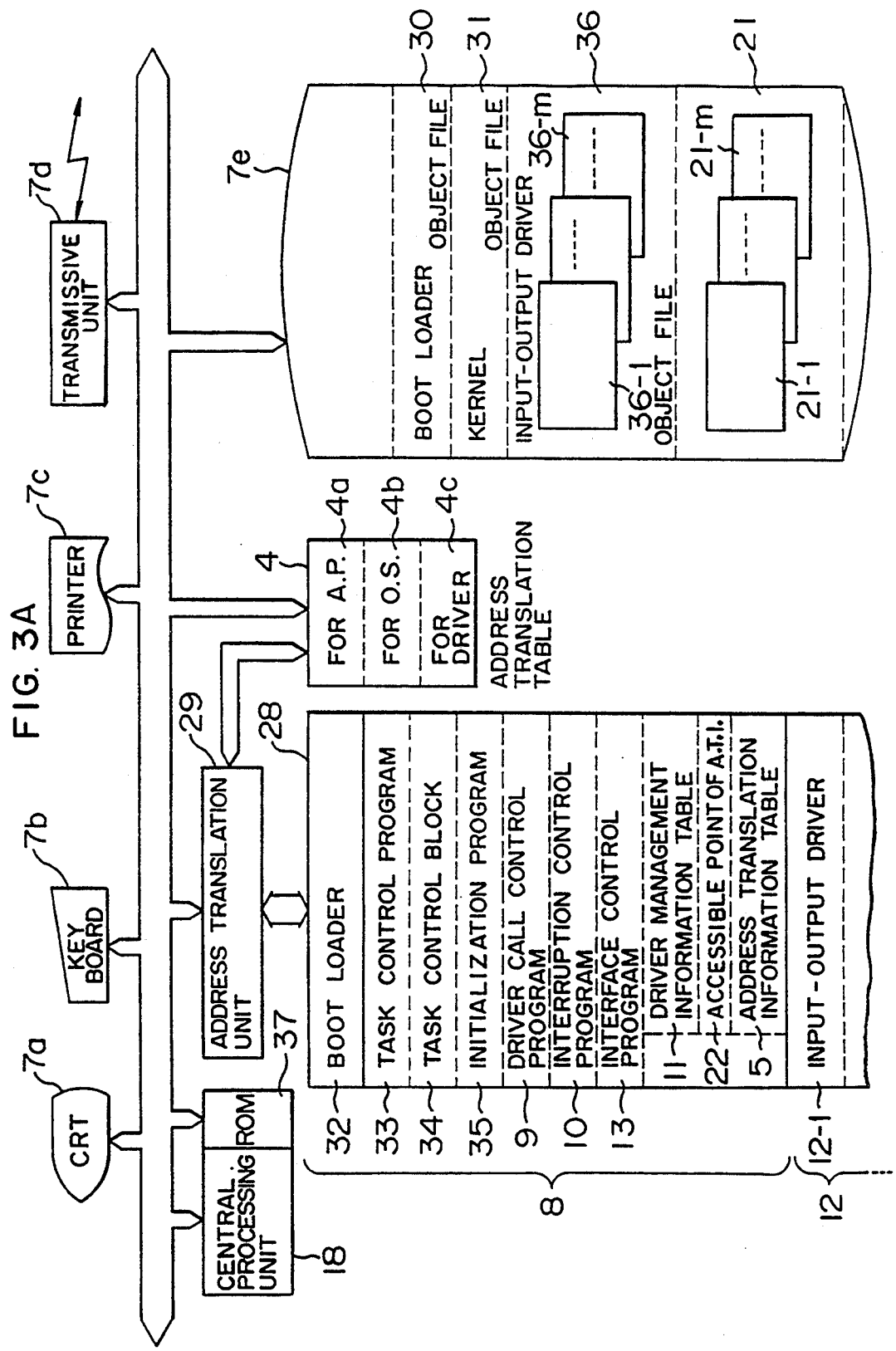

OPERATING SYSTEM GENERATION METHOD

This is a continuation of copending application(s) Ser. No. 07/412,506 filed on Sep. 26, 1989, now abandoned.

BACKGROUND OF THE INVENTION

The present invention relates to an operating system of a computer, and in particular, to an operating system generation method in which input/output device control programs can be incrementally added to an operating system.

An operating system (to be abreviated as an OS herebelow) includes a basic portion of the operating system (to be abbreviated as a kernel herebelow) serving basic functions of the operating system such as a process management and a memory management and input/output device control programs (to be referred to as input/output device drivers herebelow) for controlling input/output devices connected as peripheral devices. An operating system includes only one kernel, whereas a plurality of drivers are provided in association with the respective input/output devices.

In general, as the number of input/output devices connected to the computer increases, there appears an increased number of kinds of drivers. In addition, since different types of input/output devices are connected to the various computer systems for the respective users, the combination of the drivers included in the operating system varies between the user systems. Consequently, it is required to incorporate the driver into the operating system depending on the hardware constitution of the user system.

When a driver is incorporated into an operating system so as to actually execute the operating system for the control of the input/output devices, there arises necessity of the mutual reference between the driver and the kernel in the operating system. The mutual reference is effected through three types of operations as follows.

(1) Routine call from the kernel to the driver
(2) Routine call from the driver to the kernel
(3) Reference to data from the driver to the kernel When a user program issues an input/output request, the kernel calls a driver routine associated with the request, which corresponds to (1) above.

On the other hand, at an execution of an input/output operation, the driver routine calls the kernel routine to effect processing which can be controlled only by the kernel, which corresponds to (2) above. In addition, the driver routine references data managed by the kernel such as an address of data and a data length of data associated with the input/output operation, which corresponds to (3) above.

When incrementally adding a driver to the operating system, the mutual reference between the kernel and the driver to be added is required to be enabled at an execution time. In general, a source program of the kernel or the driver is described by use of a symbolic name also in a case of the mutual reference. On the other hand, in a load module at an execution, all symbolic names are required to be translated into absolute addresses. When incorporating a driver into the operating system, there arises a problem of a method to translate the symbolic names to be subjected to the mutual reference between the kernel and the driver, which is referred to as a problem of an address solution herebelow.

Heretofore, there have been employed two methods of incorporating a driver in an operating system, namely, a static link method and a dynamic link method.

FIG. 12 shows the static link method in which a kernel 40 is calling a driver 41-m (with a driver name DRIVER m). When source programs 43 including the kernel 40 and a plurality of drivers comprising the driver 41-m are linked with each other by use of a static linkage editor 44, a load module 47 is produced. In the load module 47, an address (MOO) of DRIVER m is arranged in a portion (an operand of a CALL instruction in the kernel 40) which calls the DRIVER m. As described above, in the static link method, the address solution between the kernel and the drivers is achieved at a link-edit phase for the following reasons. That is, since all the necessary drivers and the kernel are linked with each other at a time by means of the linkage editor 44, a symbolic name (DRIVER m in this example) of each driver associated with a mutual reference and an absolute address (which is MOO in this example and is not necessarily a physical address) of the driver can be completely obtained by the linkage editor 44.

The dynamic link method has been described in pages 173 to 176 of the "Operating Systems" written by S. E. Madnick, J. J. Donovan and published from McGraw-Hill in 1974. Referring now to FIG. 13, the address solution of the dynamic link method will be described.

In the dynamic link method, the kernel 40 and the drivers 41 is not transformed into a load module by a dynamic linkage editor 48, namely, there are produced two segments 49 and 50, which are independent of each other.

In this configuration, a portion which calls "DRIVER m" in the kernel 40 keeps a symbolic name "DRIVER m" also after the processing of the dynamic linkage editor 48 is finished. Actually, although the portion which calls "DRIVER m" is included in an application program and other drivers, it is assumed here for simplicity of description that "DRIVER m" is included in the kernel 40 or 49. When CALL "DRIVER m" is executed in the kernel 49, a linkage interrupt processing program 51 of the kernel 49 is initiated. The linkage interrupt processing program 51 is provided with a table 52 for storing therein a symbolic name of each driver and an address of the main memory where each driver is to be allocated, each driver being associated with the associated address. Each time a driver is called by the kernel 49, the linkage editor 48 solves an address for the driver to load the driver onto the main memory. Furthermore, in a portion of the table 52 associated with the driver, a symbolic name thereof and the address of the main memory are stored. As described above, when CALL "DRIVER m" is executed in the kernel 49, the linkage interrupt processing program 51 is initiated. Subsequently, the linkage interrupt processing program 51 searches the table 52 to determine whether or not "DRIVER m" is stored therein. In the initial state, the table 52 is not loaded with any significant data. Consequently, the linkage interrupt processing program 51 transfers an instruction to call "DRIVER m" from an auxiliary storage (e.g. a magnetic disk unit) to a driver beforehand incorporated in the kernel 49 for the auxiliary storage.

The DRIVER m thus called solves addresses, for example of a routine call instruction in the "DRIVER m" and is then loaded in the main memory at an address "MOO". The "DRIVER m" is thereafter executed. In the processing procedure, the address "MOO" and "DRIVER m" are written in the table 52. In a case where the kernel 49 executes again CALL "DRIVER m", the kernel 49 first passes the CALL instruction, namely, CALL "DRIVER m" to the linkage interrupt processing program 51, which then searches the table 52 so as to transfer the associated address "MOO" to the kernel 49. Thereafter, the kernel 49 calls the "DRIVER m" by use of the address "MOO".

In this fashion, according to the dynamic link method, the symbolic name of each driver is kept retained up to an execution so as to solve the address at the execution.

The driver incorporating method according to the prior art technology above is attended with the following problems.

In general, for the input/output devices connected to the computer, it is desirable for the user to arbitrarily configure combinations thereof depending on a utilization state of the computer. Moreover, a unique driver produced by the user is desirably added to the existing operating system.

However, the linkage editing of the kernel and the drivers in the form of source programs as described above is conducted on the side of the operating system supplier and hence only a load module in which all addresses have been solved is passed to the user because it is not favorable for the supplier side to provide the user with the source programs of the kernel and drivers. In actual cases, it is almost impossible for the user to acquire these source programs.

In particular, according to the static link method, described with reference to FIG. 12, since the source programs of the kernel and drivers are not sent to the user, the user cannot arbitrarily add a new driver to an operating system produced as a load module by use of the static linkage editor 44 for the following reasons. That is, in this method, the linkage editor 44 translates, in the link edit operation, symbolic names subjected to the mutual reference between the kernel 40 and the drivers 41 into addresses so as to generate an operating system 49 as an executable load module. In other words, in order to add a new driver to the operating system 49 in the load module format for which the address solution has already been completed so as to achieve the address solution for a symbolic name to be subjected to the mutual reference thereafter, it is necessary to prepare a linkage editor having such a new function. However, in the present stage of technology, there does not exist such a special linkage editor.

On the other hand, according to the dynamic link method described with reference to FIG. 13, the address solution is accomplished on the symbolic names for which the mutual reference is effected between the kernel 40 and the drivers 41 during the execution of the operating system 49; in consequence it is possible to add a driver to the operating systems 49. However, in order to implement this method, the following two items are essential as described above.

(1) Special compiler and linkage editor capable of generating a plurality of segments and of retaining symbolic names also after the processing.

(2) Hardware causing a linkage interruption when a symbolic name is referenced.

In consequence, in an ordinary computer not provided with such special software and hardware, the dynamic link method cannot be adopted.

As described above in the driver incorporation method of the prior art technology, there exists a problem that a driver cannot be added to the operating system depending on the change in the kind of the input/output device connected to the computer.

Furthermore, in a case where a driver produced by the user can be freely incorporated into the operating system, there arises a possibility that an incomplete driver including errors may be incorporated into the operating system for execution. In such a case, the drive including the errors operates in a special state. As a result, it can be considered that an invalid memory access and/or a system runaway may take play, which possibly leads to a system down.

SUMMARY OF THE INVENTION

It is therefore an object of the present invention to provide an operating system generation method which is capable of incrementally adding a driver produced by the user to an operating system without necessitating the special hardware and software required for the dynamic link method.

Furthermore, another object of the present invention is to provide a driver control method which prevents, even when an incomplete driver including errors is incorporated, a system down from being caused by a runaway of the driver.

In order to achieve the object above, the operating system generation method in accordance with the present invention includes, to generate an executable operating system from a kernel program of operating system and a plurality of input-output driver programs each stored on a magnetic disk, a step for loading the kernel program from the magnetic disk onto a first area of a main memory, a step for loading the plurality of input-output driver programs from the magnetic disk onto a second area of a main memory, each aid input-output driver program including a description such that a start address thereof matches with a start address of the second area, and a step for storing, in a driver management table disposed in the first area, as address translation information correspondence relationships between identification information of each input-output driver program and a first address in the main memory assigned to each input-output driver program wherein the kernel program is operative in response to a request issued with an arbitrary specified address to access one of the input-output driver programs for translating, based on the driver management table, the specified address into a corresponding address in the main memory, thereby accessing the input-output driver program.

Moreover, the kernel program is responsive to an instruction issued from application program to call an arbitrary input-output driver program so as to load address translation information associated with the input-output driver program from the driver management table onto an address translation table, and when the application program issues a request to access the input-output driver program called by specifying an arbitrary first address, the kernel program translates the specified first address into a second address on the main memory by use of an address translation unit.

The address translation unit reads, on receiving the first address from the kernel program, the second address by referencing the address translation table so as to pass the second address to the kernel program.

Since the kernel program accesses the called input-output driver program by use of the second address received from the address translation unit, the address solution can be achieved between the kernel program of operating system and a plurality of input-output driver programs without using the conventional linkage editor.

In addition, in order to achieve the other object above, in the driver control method according to the present invention, an indicator denoting whether or not an update is allowed for a program or data in the kernel on the main memory is disposed in a memory such that when a driver on the main memory issues a request to update an arbitrary program or data in the kernel, the memory is referenced in response to the request. In a case where the indicator allows the update of the program or data in the kernel, based on a table storing therein a correspondence relationship between an address of the main memory where the kernel is located and a virtual address associated therewith, the program or data is updated. On the other hand, when the indicator does not allow the update of the program or data in the kernel, the update thereof is inhibited.

Since the kernel is to be updated depending on the indicator stored in the memory, even if a driver including errors is incorporated in the operating system, it is possible to prevent an invalid access of the driver from destroying a program or data in the kernel.

The foregoing and other objects, advantages, manner of operation, and novel features of the present invention will be understood from the following detailed description when read in connection with the accompanying drawings.

BRIEF DESCRIPTION OF THE DRAWINGS

FIG. 2A is a schematic diagram for explaining contents of a driver management information table 11;

FIG. 2B is a diagram for explaining contents of an address translation information table 5;

FIG. 2C is an explanatory diagram useful to explain a table 22 for storing therein accessible point of address translation information;

FIGS. 3a and 3b are a block diagram showing the configuration of a system to which the present invention is applied and the method practiced therefor, respectively;

DESCRIPTION OF THE PREFERRED EMBODIMENTS

Figure 1:
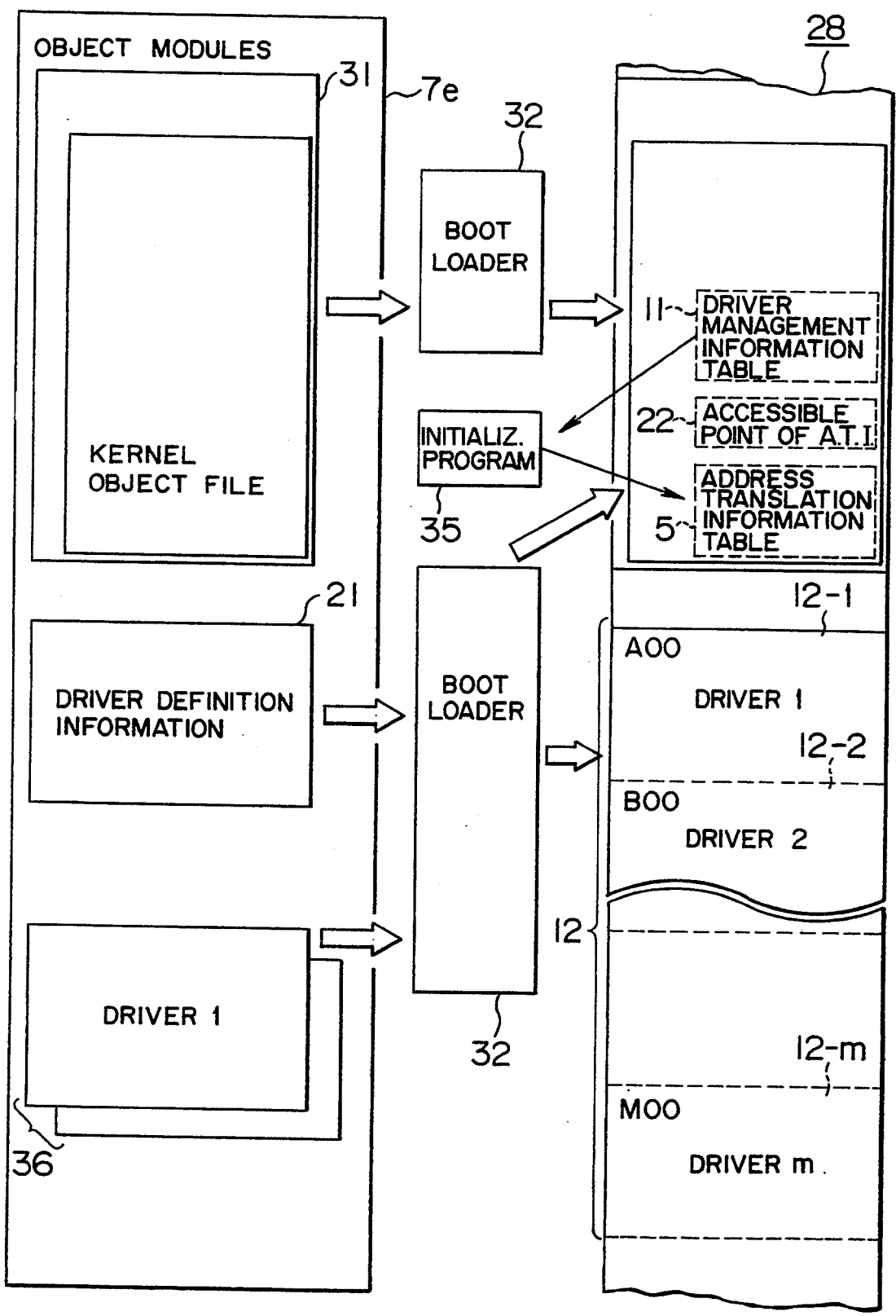
FIG. 1 is an explanatory diagram useful to explain the operating system generation method according to the present invention.

Referring now to FIGS. 1, 2A, 2B, and 2C, a description will be described of an outline of the operating system generation method according to the present invention.

The system includes a disk driver unit 7e connected to a computer so as to store therein an object program of a kernel of which internal addresses have already been solved, a plurality of driver object programs 36, and driver definition information 21 including information items such as a symbolic name of each driver. The kernel object program 31 is a load module like one in which a plurality of necessary programs are linked in advance on the side of the operating system supplier by use of a static linkage editor described in conjunction with the prior art technology. This program is different from a source program of which the contents can be freely checked or modified by the user. However, the object program 31 is not provided with a linkage to drivers controlling input/output devices. According to the present invention, the operating system supplied provides the user with the object program of the kernel in the state above such that the user can link the kernel with drivers in a desired combination.

In the internal state of the disk drive unit 7e, the address solution has not been completed between the object program 31 of the kernel and the object programs 36. In this situation, according to this embodiment, at a system initiation, the kernel 31 and the plural drivers on the drive unit 7e are loaded onto the main memory while solving the addresses thereof.

As a condition of this processing, the kernel object program 31, the driver object programs 36, and the driver definition information 21 are naturally required to be prepared.

The driver definition information 21, which will be described with reference to FIG. 2A later, includes at least information (e.g. a symbolic name) for uniquely identifying each driver. Each driver 36 includes as directory information thereof a portion of the driver definition information (e.g. a symbolic name "DRIVER m"). The user prepares necessary drivers 36 depending on a system to be actually used. It is important that all drivers to be prepared are created to start at the same address. Namely, although each driver is also constituted with a plurality of routines which are complied to be linked with each other such that the CALL instruction between the respective routines is enabled, it is necessary that the start addresses of the respective drivers as the reference for the address solution between the routines are set to be identical to each other. This is because each driver is stored in a virtual memory to be selectively switched at an execution thereof, which will be described in detail with reference to FIG. 5 later.

At a system initiation, the object program 31 of the kernel is loaded by a boot loader 32 onto the main memory beginning from a predetermined load address. Subsequently, the driver definition information 21 is read from the disk drive unit 7e so as to be set to a driver management information table 11 in the kernel thus loaded in the main memory.

FIG. 2A is a diagram for explaining the contents of the driver management information table 11, which includes a column 11a for storing a symbolic name of each driver, a column 11b for storing an interruption number uniquely assigned to each driver, a column 11c for storing an entry point (an address) of an input-output request processing program included in the driver, a column 11d for storing an entry point (an address) of an interruption processing program included in the driver, and a column 11e for storing a pointer (to be referred to herebelow as an accessible point of address translation information or an accessible point of ATI) indicating a location in a driver translation information table 5 containing an address (address translation information which will be described later in conjunction with FIG. 2B) of the main memory in which the driver is stored.

The driver definition information 21 comprises information items stored in the columns 11a to 11d for each driver. In consequence, when the driver definition information 21 is loaded in the table 11, the column 11e does not contain any significant data. Next, the boot loader 32 sequentially references the driver names in the table 11 to load the pertinent driver onto the main memory and then sets a memory address of the main memory (to be referred to as address translation information herebelow) where the driver load address is loaded therein to the column 11e. Thereafter, an initializer program 35 is executed. This program 35 generates an address translation information correlating between the virtual address of each input-output driver and the load address (real address of the main memory) of the driver stored in the column 11e. This program stores the address translation information in the table 5, and changes the load address stored in the column 11e of the table 5 to the address of the table 5. FIG. 2B shows the contents of the address translation information table 5.

For example, when the kernel executes an instruction CALL "DRIVER m" received from an application program or an interrupt control program, the table 11 is first referenced to obtain a pointer "Pm" of associated address translation information and then the table 5 is referenced to search for an address "MOO" of the main memory where the "DRIVER m" is stored, thereby accessing the "DRIVER m" based on the address "MOO".

FIG. 2C is a diagram showing contents of a table 22 for identifying a driver controllable from the kernel. In the state of this representation, the "DRIVER m" can be called from the kernel; however, at the system initiation, the field is loaded with "0". Functions of this table 22 will be described in detail by use of FIG. 5 associated with operations at an execution of the operating system.

Incidentally, in this embodiment, each time the boot loader loads a driver onto the main memory, the address translation information is set to the column 11e of the table 11. Thereafter, the initialize program 35 sets each address translation information stored in the column 11e to the table 5 such that each associated address of the table 5 is set to the column 11e of the table 11. However, each time the boot loader 32 loads a driver onto the main memory, the address translation information may be directly set to the table 5 so that the associated address of the table 5 is set to the column 11e of the table 11.

FIG. 3a shows a typical system configuration to which the present invention is applied. This system includes a processor (CPU) 18, a main memory 28, an address translation mechanism or unit 29, an address translation table 4, a read-only memory (ROM) 37, and input/output hardware units 7a to 7e. Particularly, 7a, 7b, and 7e denote a display, a keyboard, and a magnetic disk unit, respectively.

The main memory 28 comprises a boot loader 32, a driver management information table 11, a kernel 8 serving basic functions of operating systems, and drivers 12-1 to 12-m.

The kernel 8 includes programs such as an initializer program 35, a task control program 33, a driver call control program 9, an interruption control program 10, and an interface control program 13 and data including a task control block 34, a current value 22 of address translation information pointer, and a driver address translation information table 5.

Furthermore, the magnetic disk 7e comprises a boot loader object file 30, a kernel object file 31, input/output drivers 36, object files 36-1 to 36-m, and input/output driver definition information 21-1 to 21-m.

The kernel object file 31 is disposed to store therein an executable load module which is produced from the various constituent programs and data of the kernel by use of the ordinary compiler and linkage editor to solve the internal addresses. Furthermore, the boot loader object file 30 is used to beforehand store therein an executable load module produced, like in the case of the kernel object file 31, from the boot loader programs by use of the complier and linkage editor.

In addition, the driver object file 36 is disposed to store therein an executable load module generated from the source programs of the drivers. The driver definition information file 21 stores therein information defining the respective drivers such as the driver name, the interruption number, the entry point of input-output processing program, and the entry point of interruption processing program. The user beforehand loads the magnetic disk 7e with the driver object file 12 and the driver definition information file 21 necessary for the system.

Figure 3B:
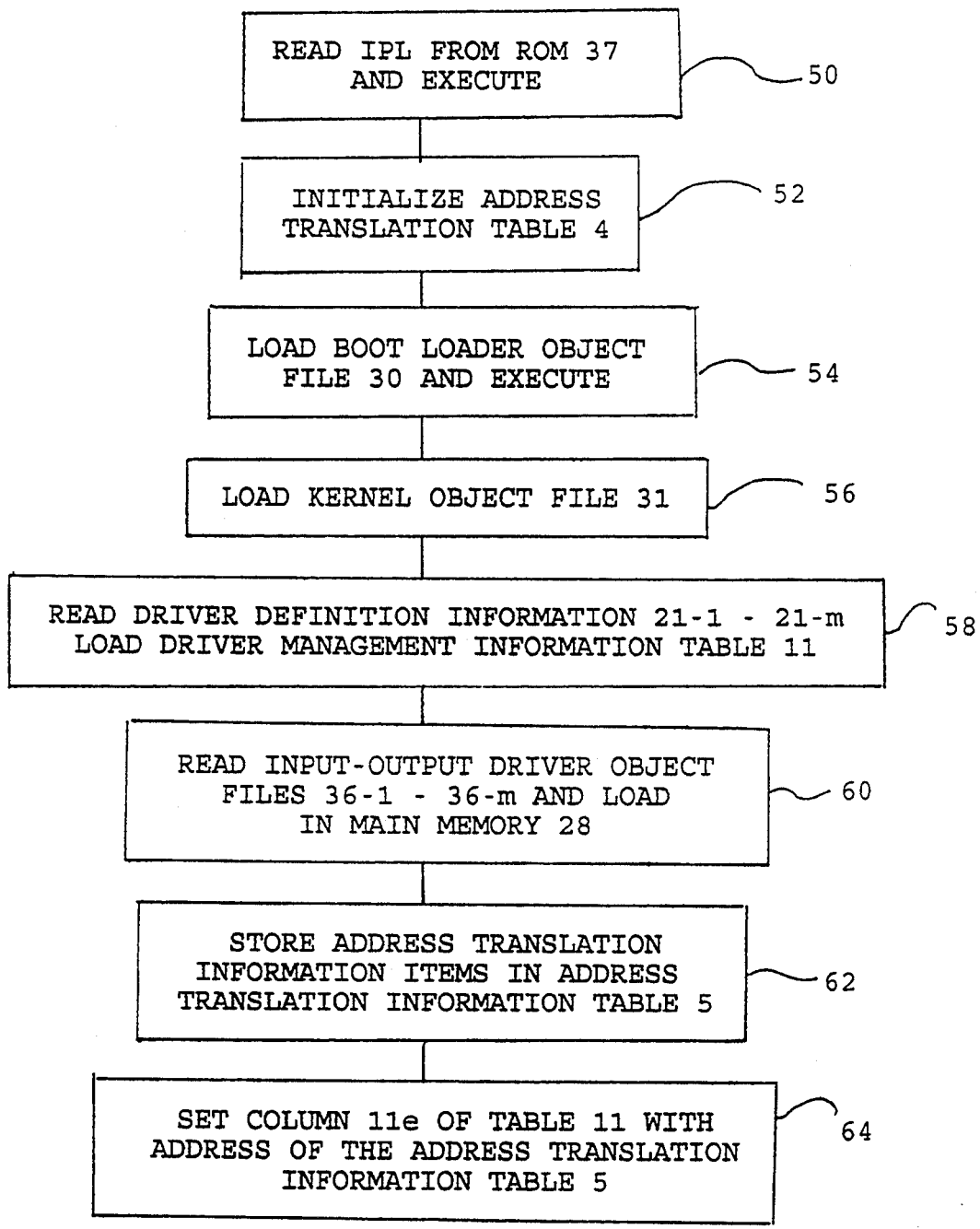

Next, referring to FIGS. 3a and 3b, a description will be given of a procedure to be employed at a system setup phase to initialize the system.

When a power-on operation is conducted, the processor 18 reads out a program from the ROM 37 to execute the program 50. The ROM 37 is disposed to store a so-called initial program loader (IPL) program, which first initializes 52 the address translation table 4. Namely, the address translation information is set to the address translation table 4 so as to match a physical address of the main memory 28 with a virtual address for the information. The address translation unit 29 is responsive to a memory access from the processor 18 to the main memory 28 with a specified virtual address at an execution of the program so as to reference the address translation table 4 to translate the specified virtual address into a physical address, thereby accessing the main memory 28 by use of the obtained physical address.

Subsequently 54, the IPL searches the contents of the magnetic disk 7e to obtain the boot loader object file 30 so as to achieve a direct memory access (DMA) transfer of the file 30 onto the main memory 28. Thereafter, control is passed to the boot loader 32.

The boot loader 32 finds out the kernel object file 31 on the magnetic disk 7e to deliver the file 31 to the main memory 28 through the DMA transfer 56. Then the boot loader 32 detects the driver definition file 21 on the magnetic disk 7e to read therefrom driver definition information including a driver name, an interruption number, an entry point of input-output processing program, and an entry point of interruption processing program. These information items are set 58 to the driver management information table 11. The system then searches the contents of the magnetic disk 7e to find out an input-output driver object file 36 associated with the driver name so as to send the file 36 to the main memory 28 through a DMA transfer 60. The memory address as the DMA transfer destination of the main memory 28 is set to a column 11e of the driver management information table 11. The processing above is repeatedly carried out to load the main memory 28 with all input/output drivers 36 through the DMA transfer. Thereafter, control is passed to the initialization program 35 of the kernel 8. Incidentally, the boot loader 32 includes a program to control the display 7a and the keyboard 7b. It may be configured such that the operator interactively selects, by use of the display 7a and the keyboard 7b, input/output drivers 36 to be sent to the main memory 28 through the DMA transfer.

The initialization program 35 sets 62 address translation information to the address translation table for operating system 4b so as to match the DMA transfer address of the kernel 8 with the first address of an operating system virtual space 2.

Next, by referencing the column 11e of the driver management information table 11, the address translation information items of the respective drivers 12-1 to 12-m are, like in the case of the operating system virtual space 2, stored 64 in the address translation information table 5. The address of the address translation information table 5 is set again to the column 11e of the driver management information table 11. The processing above is repeatedly accomplished to store address translation information of all drivers in the address translation information table 5 so as to set the pointer of each address translation information to the column 11e. Finally, 0 is loaded in the table 22 so as to complete the initialization processing.

Referring next to FIGS. 4 to 9, a description will be given of the operation at an execution of an operating system created on the main memory.

Figure 4:
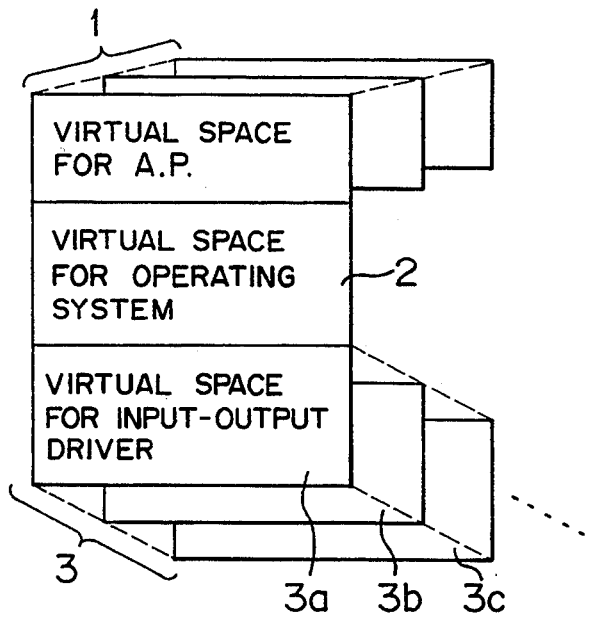
FIG. 4 is a diagram showing a layout of a virtual space to be allocated to respective programs.

FIG. 4 shows a layout related to the load module generated on the main memory by use of the operation system generation method, said module being associated with the virtual space (memory).

The configuration includes an application program virtual space 1, an operating system virtual space 2, and an input output/driver virtual space 3.

In this embodiment, when the operating system is produced, the driver virtual space is multiplexed such that a driver is stored in a virtual space.

More concretely, in order to multiplex the driver virtual space, the addresses of the main memory where the respective drivers are stored are set to the table 5 such that by loading the address translation table 4 with address translation information of a driver to be executed, the driver virtual space is switched.

Incidentally, there have been known many systems developing a multitask control function in which the application virtual space 1 is multiplexed such that an application program is assigned to a virtual space so as to concurrently execute a plurality of application programs. In order to achieve the multitask operation, each time an executable application program is initiated, a space switch control is achieved for a change-over to a virtual space allocated to the application program.

Also in this embodiment, the multitask control is to be conducted for the application program virtual space. However, since the present invention is not related to the multitask control for the application programs, details thereabout will not be described in this specification.

Figure 5:
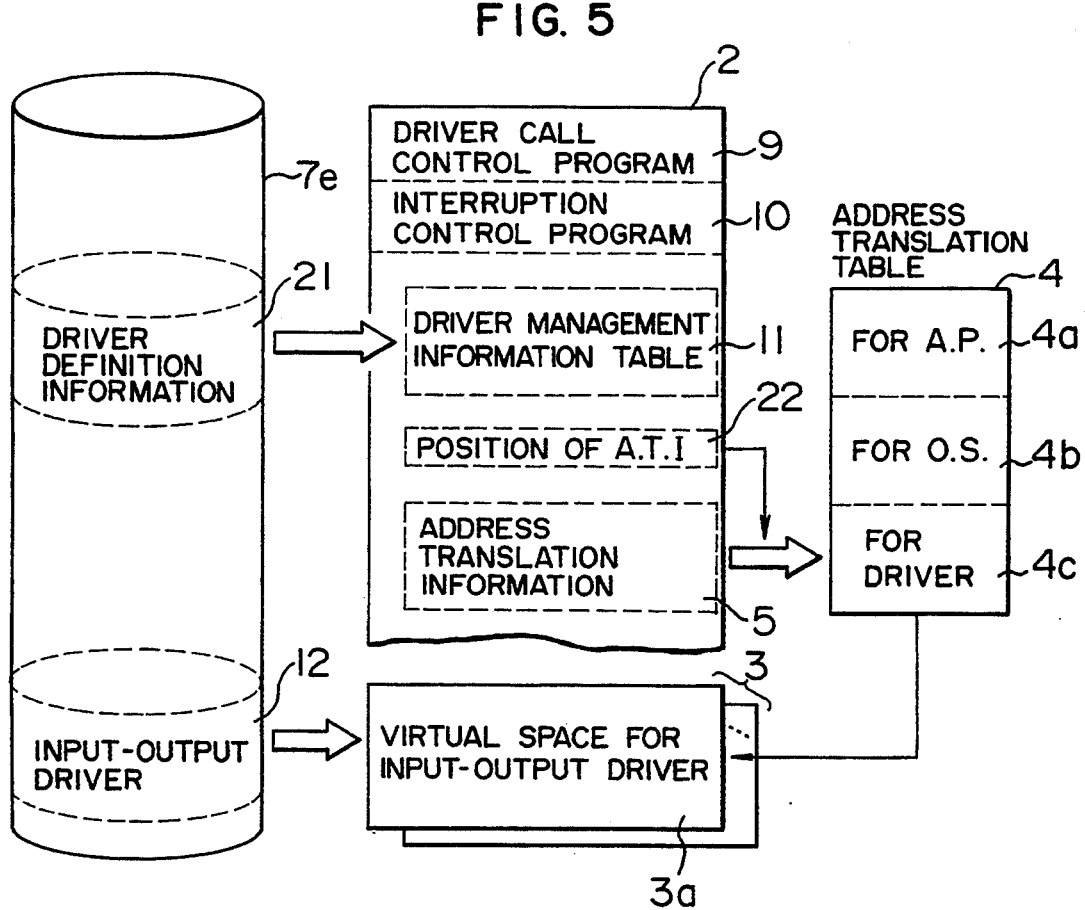
FIG. 5 is a schematic diagram showing a method of switching the virtual space.

FIG. 5 is a diagram for explaining a method of switching the virtual space for the input/output drivers. The address translation table 4 is assumed to be subdivided into partitions to store therein address translation information associated with the virtual spaces 4a, 4b, and 4c respectively for the application programs, operation systems, and input/output drivers.

As described above, only by loading the address translation table 4 with address translation information related to real addresses of the real space corresponding to virtual addresses of the virtual space, the address translation mechanism or unit 29 translates all virtual addresses produced by programs to associated real addresses so as to access a memory area containing actual objective information.

The address of the real space where the kernel is located is set to the virtual space address translation table 4b for the operating systems when the system is initialized such that the address is kept unchanged thereafter. In consequence, the operating system virtual space 2 is used as a common virtual space and hence any program and data existing in the kernel can be accessed in any case from the programs on other virtual space 1 or 3.

On the other hand, as described above, the driver virtual space 3 is designed to be switched by writing address translation information of a driver to be executed in the address translation table 4c. More specifically, in a case where an application program or the like calls an arbitrary driver, the kernel first references the driver management information table 11 to search for the called driver to attain the content of the associated column 11e. Subsequently, the content thus obtained is compared with that stored in the table 22. If these contents match with each other (case A), the address translation unit 29 accesses the driver by use of the table 4c; otherwise (case B), the content of the table 22 is replaced with the content of the column 11e associated with the called driver. Address translation information of the driver is written in the table 4c and then the address translation unit 29 accesses the driver by use of the table 4c.

For example, in a case where the virtual memory is allocated to addresses 10,000 to 20,000, when it is desired to access a routine in a driver already once called, the kernel need only access an arbitrary address in the range from address 10,000 to address 20,000. In response thereto, the address translation unit 29 references the table 4c to translate the virtual address into an address of the real memory, thereby accessing the objective memory area. In consequence, it is necessary to generate each driver with an address in the range from address 10,000 to address 20,000.

As described above, the table 22 is disposed as a memory for the kernel to identify a driver currently accessible therefrom. More concretely, the table 22 is used to store addresses contained in the table 5 loaded with the address translation information of the pertinent driver as described above.

Figure 6:
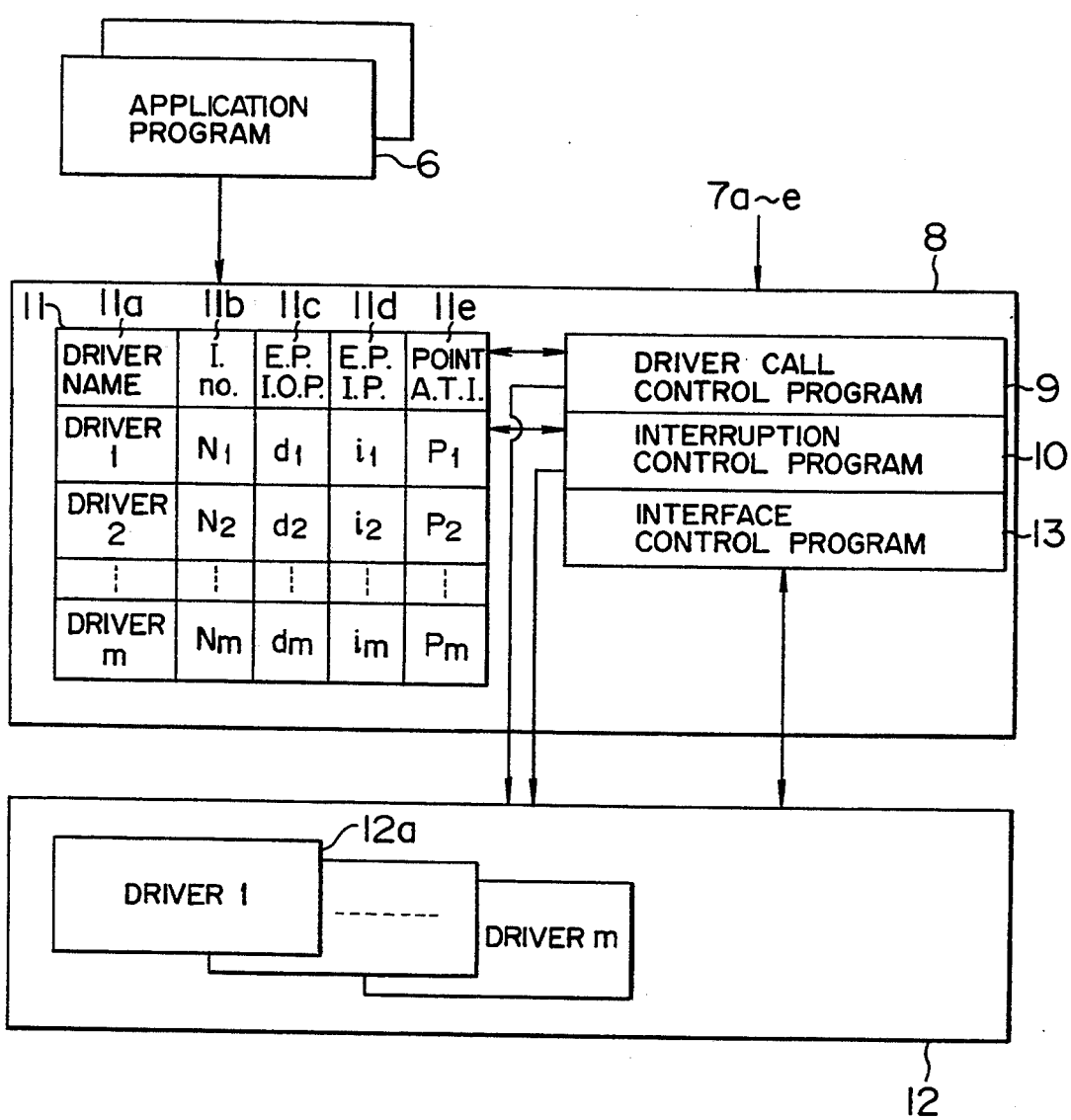
FIG. 6 is a software configuration diagram for explaining a space switch procedure.

Referring next to FIG. 6, a description will be given in detail of the space switch operation of the driver virtual space 3.

The virtual space 3 for the drivers is switched in three cases as follows.

Figure 7:
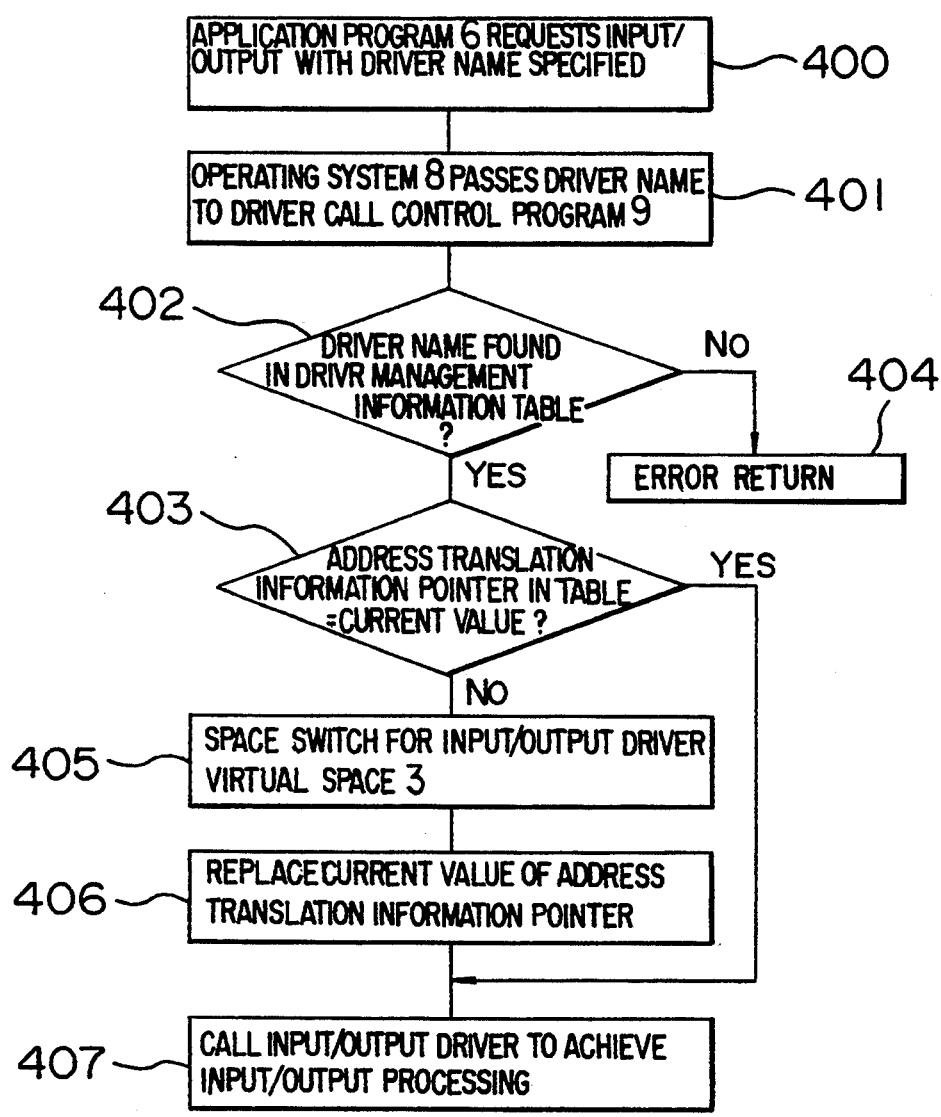
FIG. 7 is a flowchart of processing from when an application program issues an input-output request to when the input-output driver is called.

In the first case, namely, when an application program 6 issues an input output request as described in conjunction with FIG. 5, the virtual space 3 for the input/output drivers is switched to call an objective input/output driver. FIG. 7 shows a flowchart of the operation from when an application program requests an input-output operation to when the input/output driver is called. After the input-output driver achieves the input-output processing, control is returned to the requesting application program, i.e., NO ERROR RETURN.

In a step 400 of FIG. 7, an application program issues an input-output request with a specified driver name to the kernel 8. Next, the kernel 8 passes the driver name to the driver call control program 9 in a step 401. In a step 402, the driver call control program 9 searches the contents of the driver management information table 11 to determine whether or not the table 11 contains an item related to the driver name. If this is not the case, an error return is conducted in a step 404.

If the driver name is detected, a step 403 is executed to determine whether or not the content of the associated column 11e of the driver management information table 11 matches with the current address translation information pointer stored in the table 22. If these data do not match with each other, a step 405 is executed to load the input/output driver virtual space address translation table 4c with the address translation information pointer in the pertinent column 11e, thereby switching the input/output driver virtual space. Next, in a step 406, in order to identify a driver existing in the driver virtual space 3, as the current value of the address translation information pointer for the driver virtual space 3, the content of the column 11e of the driver management information table 11 is written in the table 22. In the subsequent step 407, the driver is called to execute the objective input-output processing.

Furthermore, in the step 403, when the content of the pertinent column 11e of the driver management information table 11 matches with the current address translation information pointer in the table 22, control is passed to a step 407.

In the flowchart of FIG. 7, the driver name 11a is to be communicated between the application program 6 and the kernel 8; however, the driver name 11a may be replaced with a driver identification number 11b.

Figure 8:
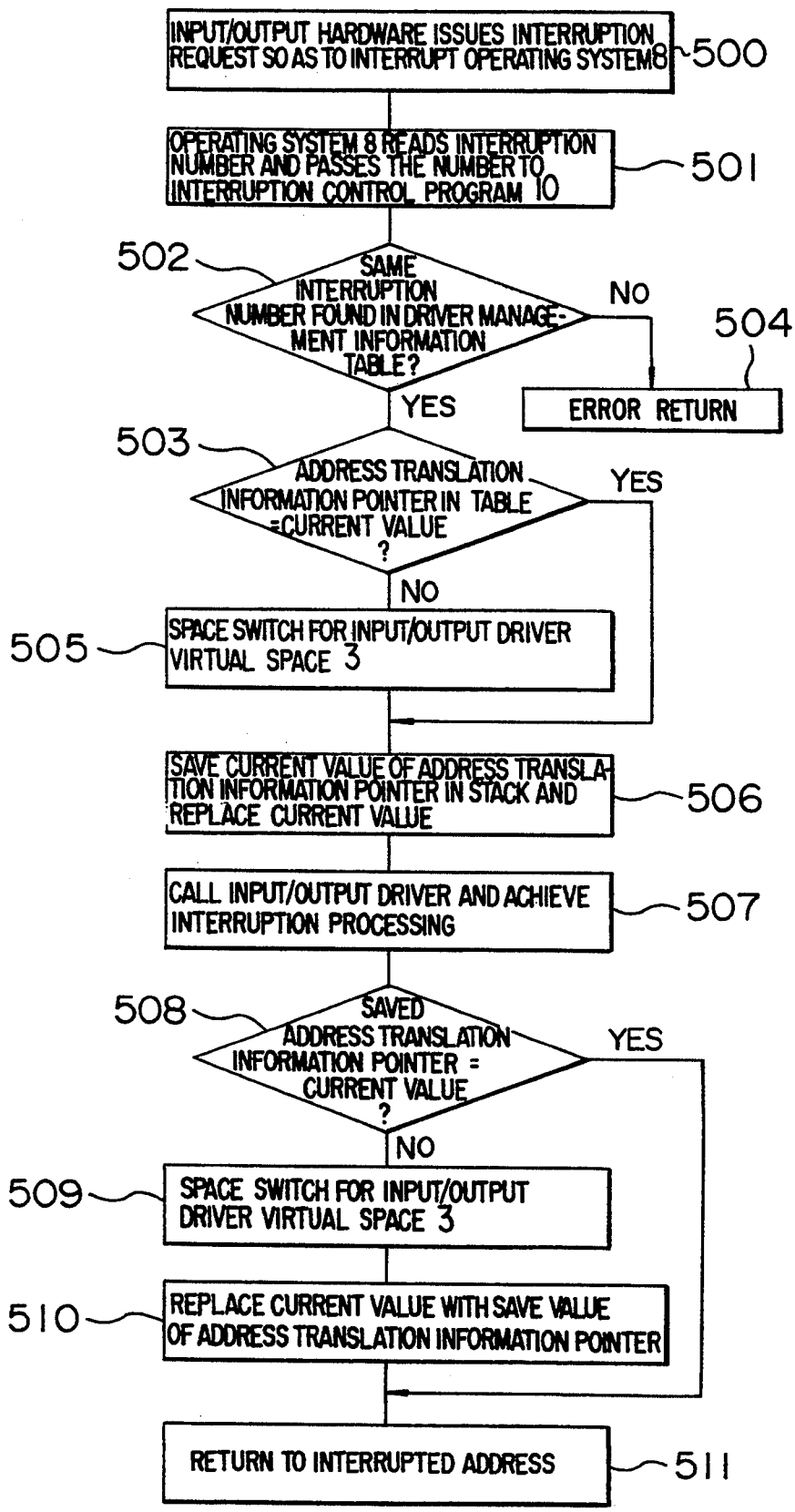
FIG. 8 is a flowchart of processing in which an input-output hardware generates an interruption cause to interrupt the operating system to call the input-output driver.

In the second case, the input/output hardware 7 issues an interruption request to call an input/output driver for interruption processing. FIG. 8 is a flowchart in which the input/output hardware issues an interruption request so as to interrupt the kernel, thereby calling the objective driver.

Referring to FIG. 8, in a step 500, the input/output hardware 7 issues an interruption request to interrupt the kernel 8. Next, in a step 501, the kernel 8 obtains an interruption number from the input/output hardware 7 so as to pass the number to the interruption control program 10.

In the subsequent step 502, the interruption control program conducts a search to determine whether or not there exists an interruption number which matches with the interruption number passed from the driver management information table 11. If such a number is missing, control is directly returned in a step 504 to an address where the interruption occurred. If the interruption number is found, a step 503 is executed to determine whether or not the content of the pertinent column 11e of the driver management information table 11 matches with the current address translation information pointer in the table 22. If these data are different from each other, in a step 505, the address translation information 5 at an address indicated by the pertinent address translation information pointer 11e is set to the address translation table 4c for the input/output driver virtual space, thereby switching the input/output driver virtual space. Thereafter, a step 506 is executed to save in the stack the current value of the address translation information pointer of the input/output driver virtual space and then the content of the column 11e of the driver management information table 11 is replaced with the current value of the address translation information pointer.

Incidentally, the stack for saving therein the current value of the address translation information pointer is disposed in a task control block 34 (FIG. 3).

Furthermore, in the step 503, if the pertinent address translation information pointer 11e of the driver management information table 11 matches with the current address translation information pointer, control is passed to the step 506.

Next, in a step 507, the input/output driver is called to achieve an interruption processing. After the interruption processing is finished, control returns to the interruption control program 10. In a step 508, the current value is compared with the saved value of the address translation information pointer. If these data are different from each other, a step 509 is conducted to load the input/output driver virtual space address translation table 4c with the address translation information 5 indicated by the address translation information pointer set to the pertinent column 11e, thereby switching the input/output driver virtual space. Subsequently, in a step 510, the current value of the address translation information pointer is replaced with the value saved in the stack. Control is thereafter returned to the interrupted address in a step 511. Moreover, in the step 508, if the current value is identical to the value of the address translation information pointer saved in the stack, the processing proceeds to a step 511.

Even when an interruption occurs at an arbitrary point of time from the input/output hardware 7 due to the space switch control above, it is possible to restore the state of the input/output driver virtual space 3 immediately before the interruption.

Finally, in the third case, the task switch takes place to pass control to a input/output driver.

Figure 9:
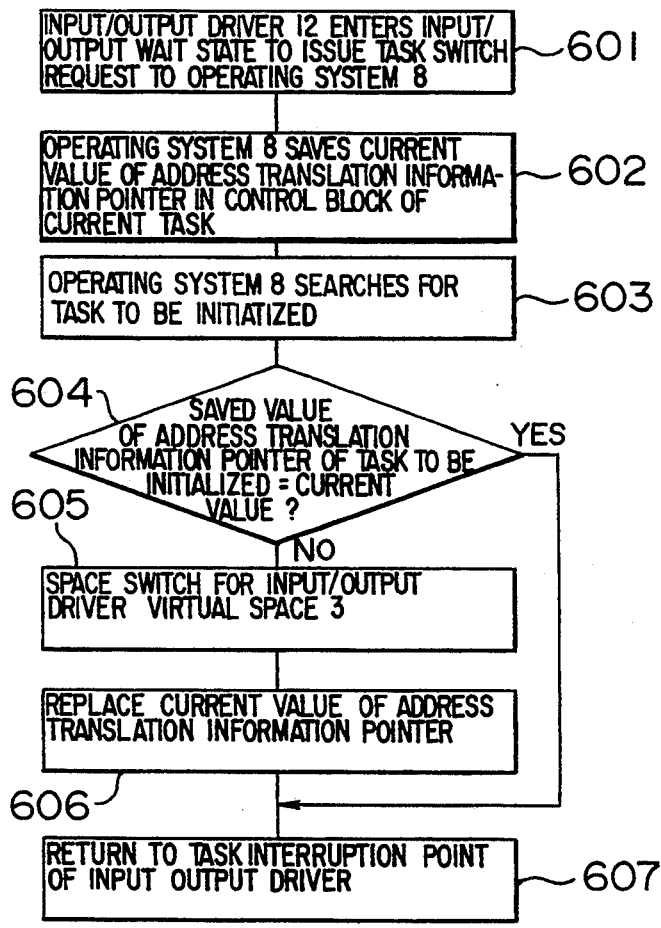
FIG. 9 is a flowchart of a space switch procedure of switching an input-output driver virtual space in association with a task switch.

In a multitask control system in which a plurality of application programs are executable at the same time, a task switch may occur because of an input-output completion wait state set during an input/output driver processing. At this point, a switch operation is conducted to pass control to another application program. If the application program is the task which has been interrupted during the input-output processing, it is necessary to switch control to the driver being used. In consequence, in association with the task switch, a space switch is required for the input/output driver virtual space. FIG. 9 shows a flowchart of a procedure of the space switch operation for the input/output driver virtual space 3 associated with a task switch.

Referring to FIG. 9, in a step 601, the input/output driver 12 enters an input-output wait state and hence issues a task switch request to the operating system 8. Next, in a step 602, the operating system 8 saves the current value of the address translation information pointer of the input/output driver virtual space in the control block 34 of the current task. Subsequently, in a step 603, the operating system 8 searches for a task to be initiated. In a step 604, the operating system 8 then compares the value of the address translation information pointer saved in the control block 34 of the task to be initiated with the current value of the address translation information pointer in the input/output driver virtual space.

If the data items are different from each other, in a step 605, the address translation information 5 at a location indicated by the address translation information pointer is set to the address translation table 4c for the input/output driver virtual space, thereby switching the input/output driver virtual space. Next, in a step 606, the address translation information pointer is written in the table 22. In a step 607, a task to be initiated is executed so as to return control to the interruption point of the input/output driver.

In the step 604, if the value of the address translation information pointer saved in the control block 34 of the task to be initiated matches with the current or present value of the address translation information pointer of the input/output driver virtual space, control proceeds to the step 607.

In this regard, the initial value of address translation information pointer to be set to the task control block 34 has been set to zero at the system setup phase.

In accordance with the present invention, for example, even in a case where incomplete input/output drivers including an input/output driver under a debug are incorporated in the system, the system operation can be accomplished without any troubles. Since an incomplete input/output driver 12 includes errors therein, there exists a danger that the operating system virtual space 2 and the application program virtual space 1 may be destroyed during an execution thereof. In such a case, a failure may take place at a location not directly related to the input/output driver 12 or at an unexpected position, thereby causing a system down. In many cases, the cause of the system down of this kind cannot be easily identified.

Figure 10:
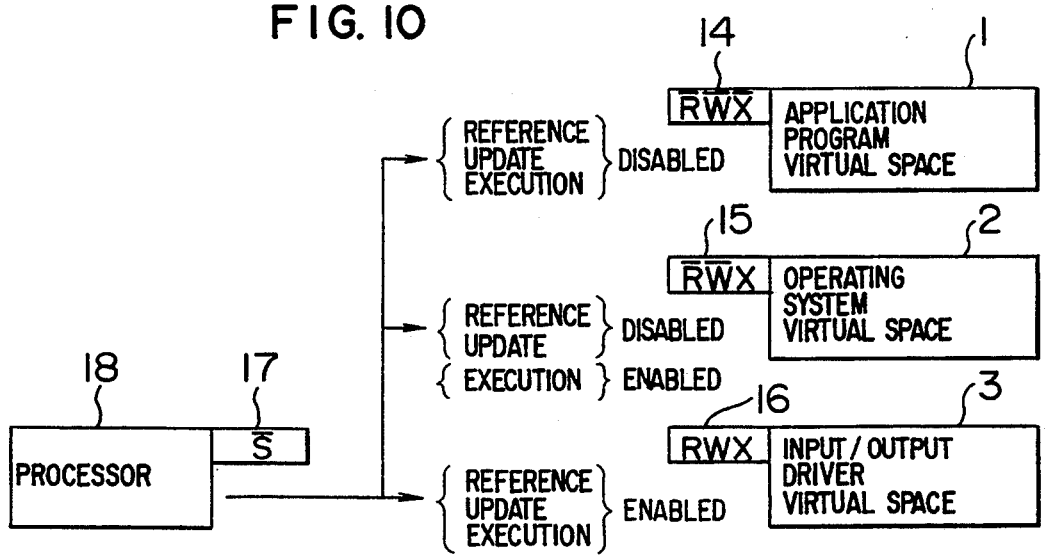
FIG. 10 is a schematic diagram showing relationships between virtual space protection modes and memory accesses.
Figure 12:
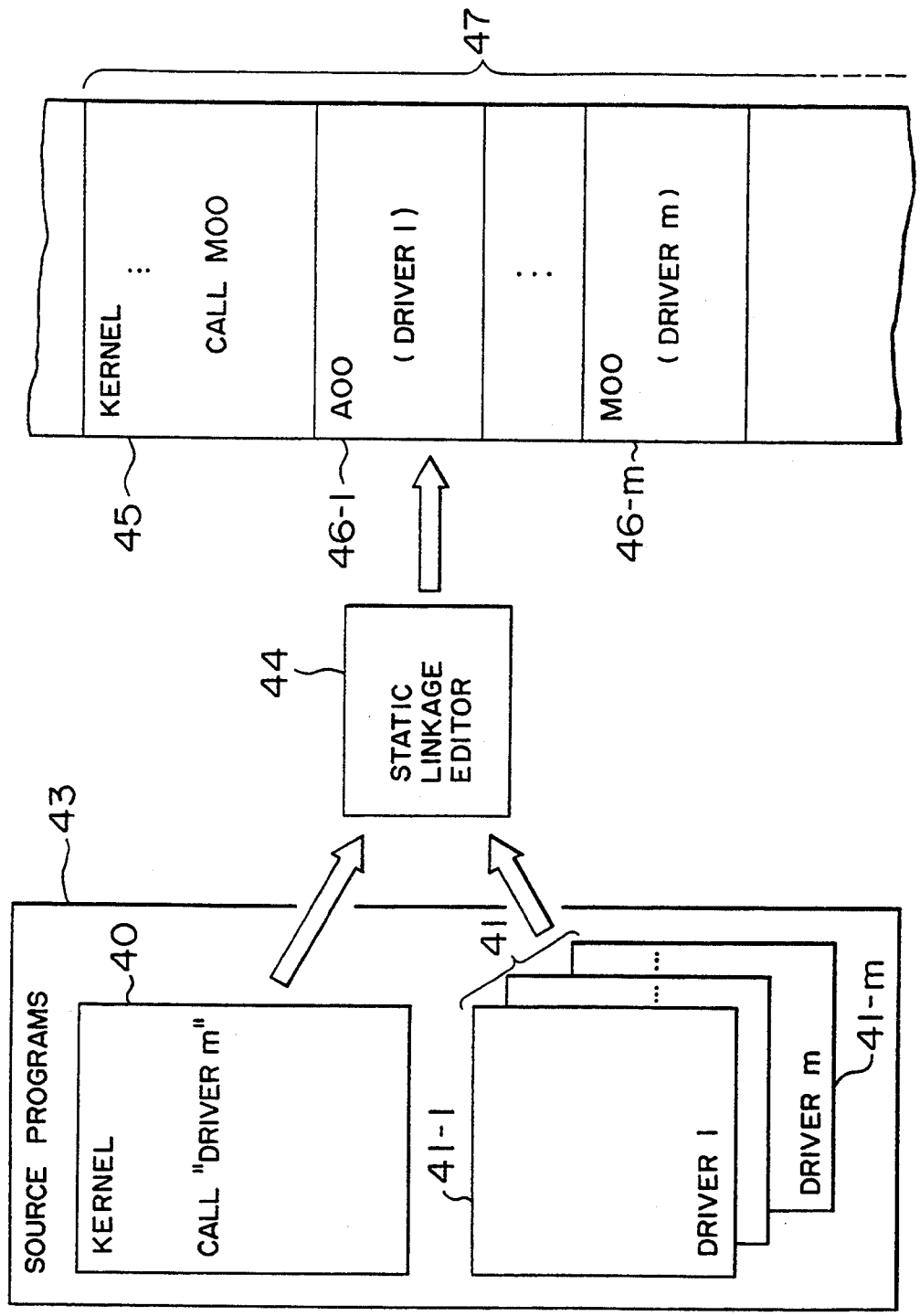
FIG. 12 is a diagram for explaining a method of generating an operating system according to the conventional static/link method.
Figure 13:
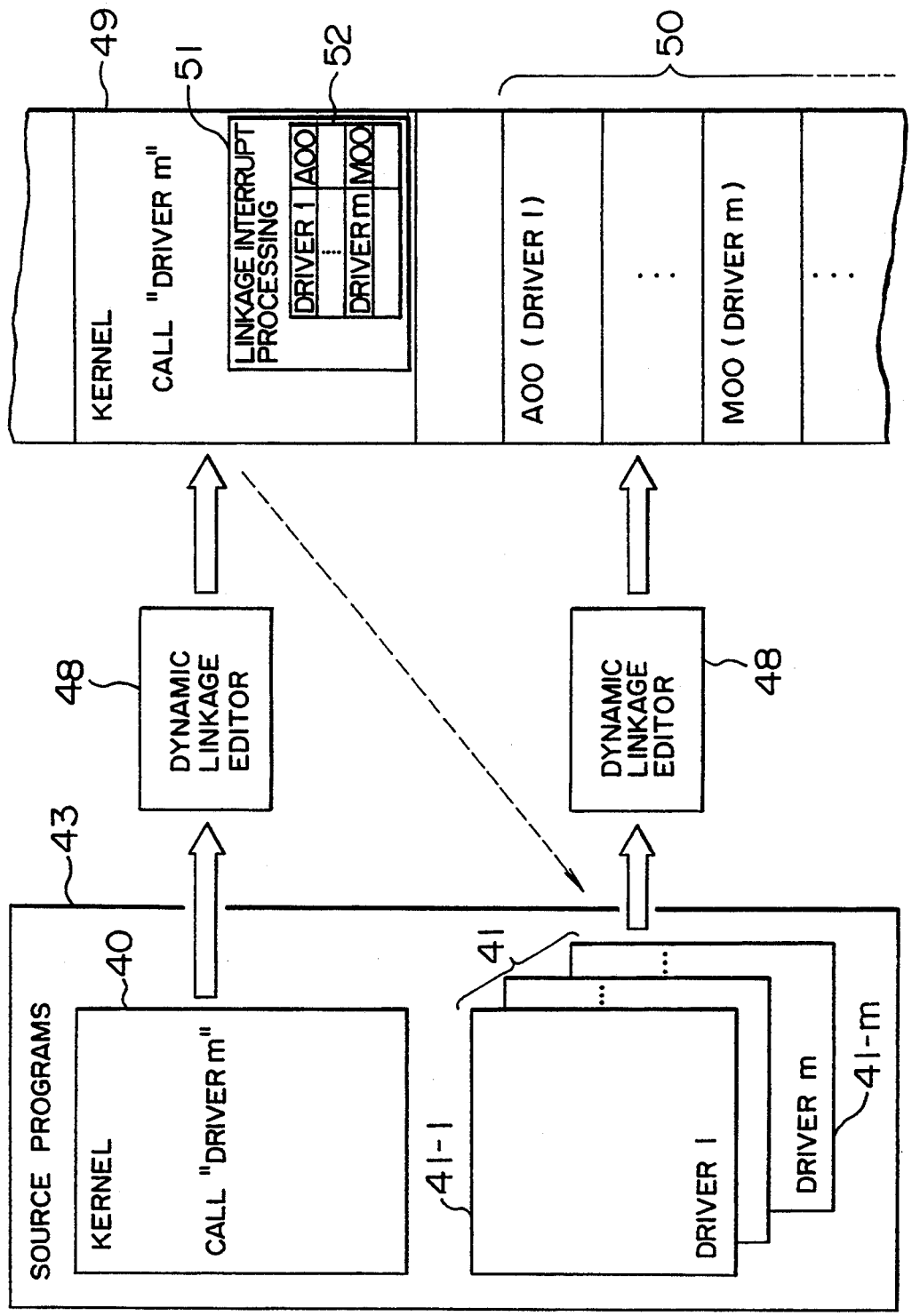
FIG. 13 is a diagram for explaining a method of generating an operating system according to the conventional dynamic link method.

According to the present invention, as shown in FIG. 10, the protection mode of the virtual space is controlled so as to prevent the runaway of the input/output driver. FIG. 10 shows relationships between the protection modes and memory accesses of the virtual spaces. This configuration includes a protection mode identifier 14 for the application program virtual space, a protection mode identifier 15 for the operating system virtual space, a protection mode identifier 16 for the input/output driver virtual space, and a processor status word 17. These identifiers are disposed in the table 4, whereas the processor status word is located in the CPU 18.

Since the kernel 8 is allowed to be executed in a priviledge mode, the processor status word 17 associated with the kernel 8 in execution is set to the priviledge mode. On the other hand, the processor status word 17 associated with the application program 6 in execution is set to the nonpriviledge mode. In this embodiment, in order to protect the overall system from the runaway of the input/output drivers, it is inhibited to execute these drivers in the privilege mode. Namely, the processor status word 17 associated with the input/output driver 12 in execution is set to the nonpriviledge mode.

During the execution of the driver 12, the application program virtual space protection mode 14 is set to disable the reference, update, and execution; the operating system virtual space protection mode 15 is set to disable the reference and update and to enable the execution; and the driver virtual space protection mode 16 is set to enable the reference, update, and execution.

In this state, if the driver 12 attempts an invalid memory access to the application program virtual space 1 or the operating system virtual space 2, the memory protection function of the address translation unit 29 rejects the memory access. However, since the kernel 8 is executed in the privilege state, regardless of the memory protection modes assigned to the virtual spaces 1, 2, and 3 respectively of the application programs, input/output drivers, and operating systems; the memory access is enabled for the kernel 8.

With the provision of the address translation unit 29, the application program virtual space 1 and the operating system virtual space 2 are protected against an invalid memory access from the driver 12, thereby avoiding the cause of the system down. In other words, even if the driver 12 causes a runaway, only the input-output control function of the driver 12 is stopped and the overall system can continue the normal operation.

Furthermore, since the address translation unit 29 reports an interruption of the address exception to the kernel 8 when the invalid memory access is attempted, it is possible to easily attain data to identify the cause of the failure in the input/output driver 12 attempting the invalid memory access.

Incidentally, according to the embodiment above, among the problems associated with the addresses in a linkage to be established between the kernel and a driver on the user side, there has been described a method of solving the problem appearing in a call from the kernel to the driver. However, the problems associated with the addresses in a linkage to be established between the kernel and a driver are required to be solved for an operation such as a routine call from any driver to the kernel.

For this purpose, the embodiment is provided with an interface control program 13 as shown in FIG. 6.

Incidentally, the method of solving the problems above has been described in detail in the U.S. patent application Ser. No. 280,832 titled "Operating System Generation Method". In consequence, description thereabout will be omitted.

The interface control program 13 is located in the operating system virtual space 2 so as to call a control routine in the kernel 8, the routine being necessary for the driver 12. In this case, a restriction may be imposed on the system such that by checking parameters passed from the input/output driver 12, only an allowed routine may be used by the driver.

Moreover, in order to call an operating system control function only executable in the privilege mode, the interface control program 13 is called by use of a software interruption. If the system is established such that the priviledge mode is set after the software interruption, any operating system controlfunction can be called in this fashion.

Figure 11:
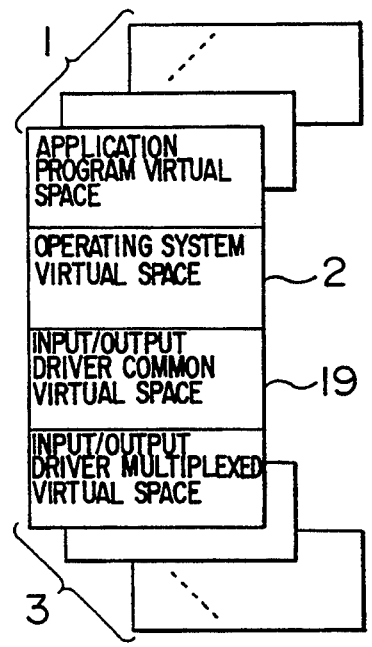
FIG. 11 is a diagram showing a virtual space layout when an input-output driver common virtual space is established.

The present invention is not restricted by the virtual space layout of FIG. 4. As shown in FIG. 11, the driver common virtual space 19 may be disposed in the driver virtual space 3. In general, since a high-speed response is required for the interruption processing in the respective drivers, it is effective to extract the interruption processing routines from the drivers so as to allocate the routines to the driver common virtual space 19. Moreover, an input/output driver requiring a high-speed input-output control may be located in the driver common virtual space 19.

In the aforementioned embodiments, the input/output drivers are assumed to be allocated in the real space when the system is initiated. However, it may also be possible to keep the driver 12 stored in a file such that the input/output driver 12 is loaded in the input/output driver virtual space 3 in response to a call thereof. The address translation information generated at this point may be set to the address translation table 4c for the driver virtual space.

Various kinds of driver allocation media may be employed depending on the degrees of necessity of the respective drivers such that drivers to be called at a very high speed and those to be called at an ordinary speed are stored in the driver common virtual space and the driver multiplexed virtual space, respectively. This leads to an effect that a large number of drivers can be incorporated into the system.

As can be seen from the embodiments above, in the operating system generating method according to the present invention, the drivers prepared by the user can be incrementally incorporated into the operating system. This leads to an effect that a large number of drivers can be incorporated into the system.

As can be seen from the embodiments above, in the operating system generating method according to the present invention, the drivers prepared by the user can be incrementally incorporated into the operating system.

Furthermore, in the driver control method according to the present invention, even when incomplete drivers having errors are incorporated into the operating system, it is possible to prevent a system down due to a ranaway of the driver.

While particular embodiments of the invention have been shown and described, it will be obvious to those skilled in the art that various changes and modifications may be made without departing from the present invention in its broader aspects.

What is claimed is:

1. A driver program control method executed by an operating system of a computer in which input-output driver programs can be incrementally added to said operating system, the method comprising the steps of:

storing in a main memory of the computer indicator information indicating whether or not an update is enabled for a program or data in a kernel program of the operating system stored in a first area of the main memory;

receiving, by the kernel program, an update request from an arbitrary input-output driver program stored in a second area of the main memory specifying an arbitrary program or data in the kernel program for updating;

detecting a content of the indicator information in the main memory responsive to the received update request; and, preventing the arbitrary input-output driver program from updating the program or data in the kernel program operative depending on the content of the indicator information in the main memory.

* * * * *